United States Patent
Biswal et al.

(10) Patent No.: US 12,298,912 B1
(45) Date of Patent: May 13, 2025

(54) ENHANCED WRITE BUFFER FLUSH SCHEME FOR MEMORY DEVICES WITH HIGH DENSITY STORAGE MEMORY ARCHITECTURE

(71) Applicant: QUALCOMM Incorporated, San Diego, CA (US)

(72) Inventors: Rajesh Kumar Biswal, Puri (IN); Manmeet Singh Ahluwalia, Bangalore (IN); Surendra Paravada, Hyderabad (IN); Madhu Yashwanth Boenapalli, Hyderabad (IN); Sai Praneeth Sreeram, Anantapur (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/509,066

(22) Filed: Nov. 14, 2023

(51) Int. Cl.
*G06F 12/0891* (2016.01)
*G06F 12/02* (2006.01)

(52) U.S. Cl.
CPC ...... *G06F 12/0891* (2013.01); *G06F 12/0238* (2013.01); *G06F 2212/7203* (2013.01)

(58) Field of Classification Search
CPC ............. G06F 12/0891; G06F 12/0238; G06F 2212/7203
See application file for complete search history.

(56) References Cited

U.S. PATENT DOCUMENTS

| | | | | |
|---|---|---|---|---|
| 2006/0143394 | A1* | 6/2006 | Petev | G06F 12/121 711/E12.07 |
| 2008/0005478 | A1* | 1/2008 | Lubbers | G06F 12/0804 711/143 |
| 2016/0357471 | A1* | 12/2016 | Zevulun | G06F 3/061 |
| 2021/0294654 | A1* | 9/2021 | Boenapalli | G06F 9/5016 |

* cited by examiner

*Primary Examiner* — Kalpit Parikh
(74) *Attorney, Agent, or Firm* — NORTON ROSE FULBRIGHT US LLP/Qualcomm

(57) ABSTRACT

This disclosure provides systems, methods, and devices for memory systems that support enhanced write buffer flush schemes. In a first aspect, a method performed by a memory controller includes maintaining a list of data segments stored in a write buffer having a single-level cell memory architecture. The list includes, for each entry of the list, a data segment identifier of a respective data segment and an available contiguous memory space in the write buffer if the data segment is flushed. The list is sorted based on the available contiguous memory space. The method includes detecting a flush opportunity and initiating, based on the detecting, a flush operation to write a first data segment that corresponds to a first entry of the list from the write buffer to a memory module having a higher storage density memory architecture. Other aspects and features are also claimed and described.

27 Claims, 7 Drawing Sheets

700

┌─────────────────────────────────────────────────────┐
│ Maintain, at a memory controller, a list of data segments │
│ stored in a write buffer, the list including, for each entry of │ 702
│ the list, a data segment identifier of a respective data │
│ segment and an available contiguous memory space in the │
│ write buffer if the data segment is flushed, where the list is │
│ sorted based on the available contiguous memory space │
└─────────────────────────────────────────────────────┘
                          │
                          ▼
┌─────────────────────────────────────────────────────┐
│ Detect, by the memory controller, a flush opportunity │ 704
│           associated with the write buffer           │
└─────────────────────────────────────────────────────┘
                          │
                          ▼
┌─────────────────────────────────────────────────────┐
│ Initiate, by the memory controller based on detection of the │ 706
│   flush opportunity, a flush operation to write a first data │
│ segment from the write buffer to a memory module, the first │
│   data segment corresponding to a first entry of the list │
└─────────────────────────────────────────────────────┘

FIG. 7

ENHANCED WRITE BUFFER FLUSH SCHEME FOR MEMORY DEVICES WITH HIGH DENSITY STORAGE MEMORY ARCHITECTURE

TECHNICAL FIELD

Aspects of the present disclosure relate generally to an apparatus and method for controlling a memory device. Some aspects may, more particularly, relate to an apparatus and method for controlling operations of a memory device to support available contiguous space-based write buffer flush functionality that improves throughput of write operations to memory architectures capable of storing multiple bits per memory cell.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

Flash memory systems, such as a UFS memory systems, provide improved storage capabilities with fast access times, resulting in the proliferation of flash memories in a variety of devices. Such flash memory systems may store data in memory regions having different memory architectures. For example, flash memory systems may implement a single-level cell (SLC) memory architecture in which each memory cell is capable of storing a single bit of data, or high density storage memory architectures capable of storing multiple bits per memory cell, such as a multi-level cell (MLC) memory architecture capable of storing two bits of data per memory cell or a triple-level cell (TLC) memory architecture capable of storing three bits of data per memory cell. Although MLC and TLC memory architectures may support higher storage density by allowing more data to be stored in the same physical space as compared to SLC memory architectures, the SLC memory architectures may have faster write and erase speeds, higher endurance, and better reliability than the MLC and TLC memory architectures. To improve the throughput of a memory system that includes a main storage having a MLC or TLC memory architecture, the memory system may include a write buffer having a SLC memory architecture. The write buffer temporary stores data before the data is written to the main storage, allowing for faster write operations, particularly when a memory controller performs write operations at random locations in the write buffer having sufficient available memory space. Although this location selection scheme may initially speed up write operations at the write buffer, writing data to random locations often results in the data in the write buffer becoming fragmented. If the data becomes sufficiently fragmented, the available memory space may not be contiguous such that incoming data that has a smaller size than a total available storage space of the write buffer is unable to be stored. In such a situation, the incoming data is written directly to the main storage, which degrades throughput of the memory system.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects disclosed herein describe memory systems, such as flash memory devices, that support enhanced write buffer flush schemes for writing data from a write buffer to main storage having a higher storage density. In aspects, a memory device may include a write buffer that includes a single-level cell (SLC) memory architecture and main storage having a higher storage density, such as a multi-level cell (MLC) memory architecture or a triple-level cell (TLC) architecture. A memory controller may be configured to maintain a list of data segments stored in the write buffer and, for each data segment, an amount of available contiguous memory space if the respective data segment is flushed from the write buffer to the main storage. The memory controller may sort the list in descending order of available contiguous memory space and, when the memory controller identifies a flush command from a host device or dormancy of a connection to the host device, the memory controller may initiate a flush operation for the data segment at the front of the list. After the data segment is flushed (e.g., written to the main storage having the higher storage density), the entry at the front of the list is deleted, such that the entry associated with the next largest available contiguous memory space moves to the front of the list. When a new data segment is written to the write buffer, the memory controller may add an entry to the list based on the new data segment, and the list may be resorted. In this manner, the write buffer flush scheme described herein may optimize the amount of available contiguous memory space in the write buffer after each flush operation, thereby reducing the likelihood that a data segment will be written directly to the main storage.

In one aspect of the disclosure, an apparatus includes a memory controller coupled to a write buffer and configured to access data stored at the write buffer. The write buffer has a SLC memory architecture. The memory controller is also coupled to a memory module through a first channel and configured to access data stored in the memory module through the first channel. The memory module has a higher storage density memory architecture than the write buffer. The memory controller is further coupled to a host device through a first interface and configured to communicate with the host device over the first interface. The memory controller is configured to perform operations including maintaining a list of data segments stored in the write buffer. The list includes, for each entry of the list, a data segment identifier of a respective data segment and an available contiguous memory space in the write buffer if the data segment is flushed. The list is sorted based on the available contiguous memory space. The operations also include detecting a flush opportunity associated with the write buffer. The operations further include initiating, based on detection of the flush opportunity, a flush operation to write a first data segment from the write buffer to the memory module. The first data segment corresponds to a first entry of the list. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, a wireless communication device includes a flash memory device and at least one processor coupled to the flash memory device through a first interface. The flash memory device includes a memory controller, a write buffer having a SLC memory architecture, and a memory module having a higher storage density memory architecture than the write buffer. The memory controller is configured to maintain a list of data segments stored in the write buffer. The list includes, for each entry of the list, a data segment identifier of a respective data segment and an available contiguous memory space in the write buffer if the data segment is flushed. The list is sorted based on the available contiguous memory space. The memory controller is also configured to detect a flush opportunity associated with the write buffer. The memory controller is further configured to initiate, based on detection of the flush opportunity, a flush operation to write a first data segment from the write buffer to the memory module. The first data segment corresponds to a first entry of the list. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow chart illustrating a method for an enhanced write buffer flush scheme for writing data to main storage capable of storing multiple bits of data per cell by a flash memory device according to some embodiments of the disclosure.

Like reference numbers and designations in the various drawings indicate like elements.

DETAILED DESCRIPTION

Figure 1:
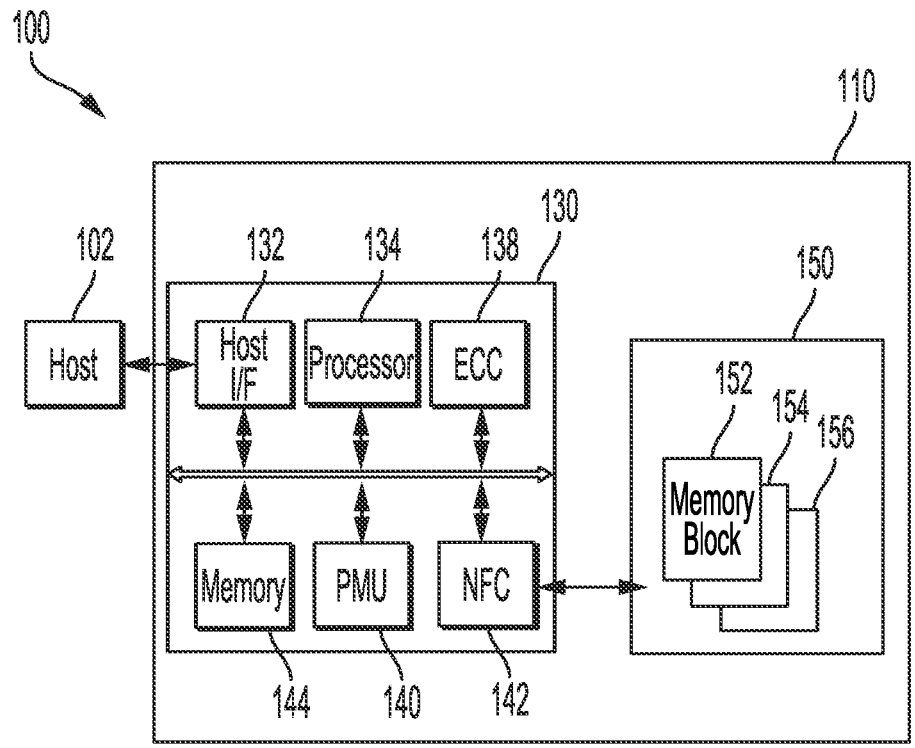
FIG. 1 is a block diagram illustrating a data processing system including a memory system in accordance with an embodiment of the present invention.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in those operations for enhanced write buffer flush schemes for writing data from a write buffer of a memory system to main storage having a higher storage density than the write buffer. For example, a memory device may include a write buffer that includes a single-level cell (SLC) memory architecture and main storage having a higher storage density, such as a multi-level cell (MLC) memory architecture or a triple-level cell (TLC) architecture. Although such higher density main storage may be able to store additional data in less physical area, write operations may be slower than for less dense memory architectures, and thus a write buffer may improve overall throughput for writing data to the main storage. A memory controller of the memory system may be configured to maintain a list of data segments stored in the write buffer and the corresponding amount of potential available contiguous memory space if the respective data segment is cleared from the write buffer. The memory controller may sort the list in descending order of available contiguous memory space and, when the memory controller identifies a flush opportunity, the memory controller may initiate a flush operation for the data segment at the front of the list (e.g., a data segment that, when flushed, will free up the most contiguous memory space in the write buffer). After the data segment is flushed from the write buffer to the main storage, the memory controller may delete the entry at the front of the list, such that the entry associated with the next largest available contiguous memory space moves to the front of the list. When a new data segment is written to the write buffer, the memory controller may add an entry to the list based on the new data segment and a corresponding amount of potential available contiguous memory space associated with flushing the new data segment, and the list may be resorted based on the amount of contiguous memory space of the entries. In some implementations, if a write command is received by the memory controller prior to completion of the flush operation for a data segment, the flush operation is paused and the write command is performed and the list updated based on the new data segment and resorted. After completion of the write command, the flush operation is continued to flush a remainder of the data segment, and the list is updated to delete the entry corresponding to the flushed data segment. Additional flush operations are held until completion of the paused flush operation, thereby enabling flushing data segments in sorted order.

Particular implementations of the subject matter described in this disclosure may be implemented to realize one or more of the following potential advantages or benefits. In some aspects, the present disclosure provides techniques for improved performance of a memory system, such as improved throughput of writing to the memory system, including to a main storage portion of the memory system that is capable of storing multiple bits of data per cell. Such improved throughput may be achieved by leveraging a write buffer (e.g., a Turbo Write Buffer) that includes a single-level cell (SLC) memory architecture and an enhanced write buffer flush scheme for the write buffer. For example, the write buffer may be configured to cache entries to be written to the higher-density main storage, and entries from the write buffer may be flushed to the main storage based on a list maintained by the memory controller. Instead of flushing entries according to a first in, first out (FIFO) scheme, the memory controller may sort the list of entries in the write buffer based on the amount of contiguous memory space that is freed up by clearing the respective data segment. In this manner, the write buffer flush scheme described herein may optimize the amount of potential available contiguous memory space in the write buffer after each flush operation. For example, each time a flush operation is performed, the maximum possible amount of contiguous storage in the write buffer is achieved, which reduces the likelihood that a new data segment will not fit in the write buffer and thus be written directly to the main storage. Reducing the amount of write operations performed directly to main storage improves the throughput of the memory system, particularly as the data stored in the write buffer becomes more fragmented during operation of the memory system.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels.

The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 6.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as memory blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host IF unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host IF unit 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

Figure 2:
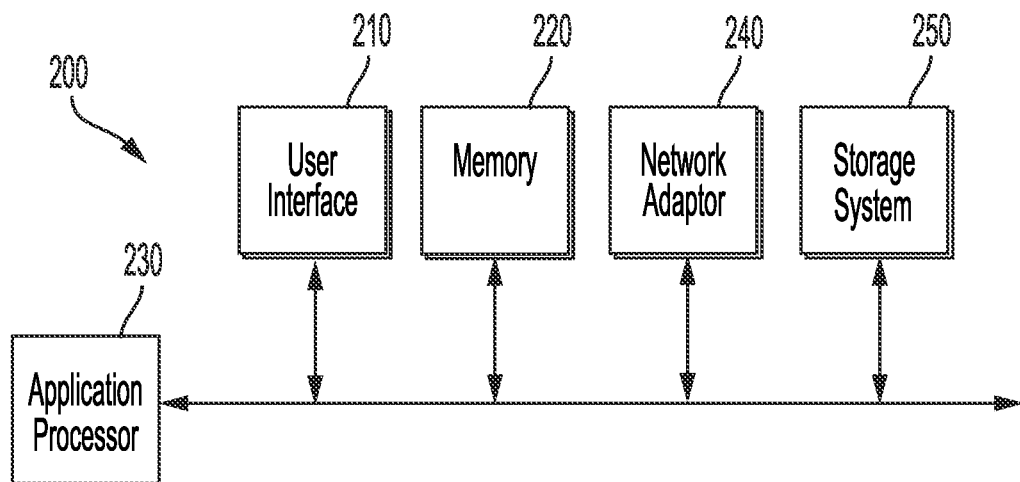
FIG. 2 is a block diagram illustrating an example electronic device including the memory system according to one or more aspects of the disclosure.

FIG. 2 is a block diagram illustrating an example electronic device including the data processing system 100 according to one or more aspects of the disclosure. The electronic device 200 may include a user interface 210, a memory 220, an application processor 230, a network adaptor 240, and a storage system 250 (which may be one embodiment of the data processing system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMO-LED) display device, a light emitting diode (LED), a speaker, or a haptic motor.

Figure 3:
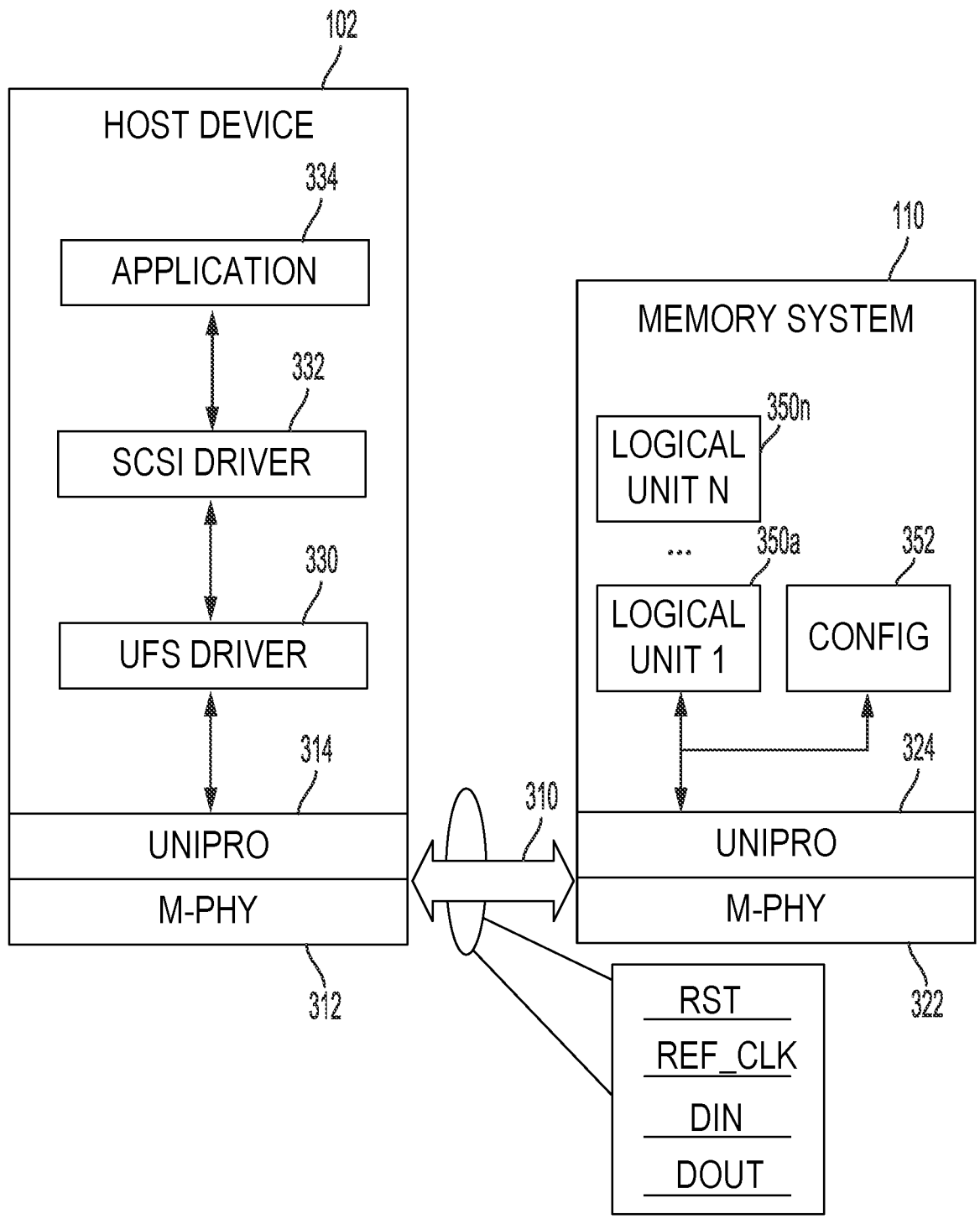
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through a memory interface 310 (e.g., a first interface). The first interface may, for example, be a memory interface such as a physical interface (PHY) connecting the host device 102 to the memory system 110. The host device 102 may include physical layer access block 312, which is configured to generate signals for output to the memory interface 310 and process signals received through the memory interface 310. The memory system 110 includes a similarly-configured physical layer access block 322 for communicating on the memory interface 310. One example physical layer specification for communicating on the memory interface 310 is the MIPI M-PHY™ physical layer specification.

The host device 102 also includes a data link layer block 314 configured to format frames of data for transmission on the memory interface 310. The frames may be provided to the physical layer access block 312 for transmission. The data link layer block 314 may receive frames from the physical layer access block 312 and decode frames of data received on the memory interface 310. The memory system 110 includes a similarly-configured data link layer block 324 for processing frames transmitted on or received on the memory interface 310 by the physical layer access block 322. One example data link protocol for communicating on a MIPI M-PHY™ physical link is the MIPI UNIPRO™ specification.

The memory system 110 includes N logical units 350a-n comprising logical memory blocks for storing information including user data (e.g., user documents, application data) and configuration data (e.g., information regarding operation of the memory system 110). The logical units 350a-n may map to portions of the physical memory blocks 152, 154, and 156. Some of the logical units 350a-n or portions of the logical units 350a-n may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350a-n.

The memory system 110 also includes configuration structures 352. The configuration structures 352 may include information such as configuration descriptors for boot enable (bBootEnable), initial power mode (bInitPowerMode), RPMB active (bRPMBRegionEnable), and/or RPMB region sizes (bRPMBRegion1Size, bRPMBRegion2Size, bRPMBRegion3Size). Such configuration structures and/or parameters may, for example, be configuration structures and/or parameters identified by the UFS standard.

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the memory interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the memory interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The memory interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N.

The UFS driver 330 may generate and decode packets to carry out transactions requested by the application 334. The packets are transmitted over the memory interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations includes read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanenetWPEn, fPowerOnWPEn, fBackgroundOpsEn, fDeviceLifeSpanModeEn, fPurgeEnable, fRefreshEnable, fPhyResourceRemoval, fBusyRTC, and/or fPermanentlyDisableFwUpdate. Example attributes include bBootLunEn, bCurrentPowerMode, bActiveICCLevel, bOutOfORderDataEn, bBackgroundOpStatus, bPurgeStatus, bMaxDataInSize, bMaxDataOutSize, dDynCapNeeded, bRefClkFreq. Such flags may, for example, be flags identified by the UFS standard.

Figure 4:
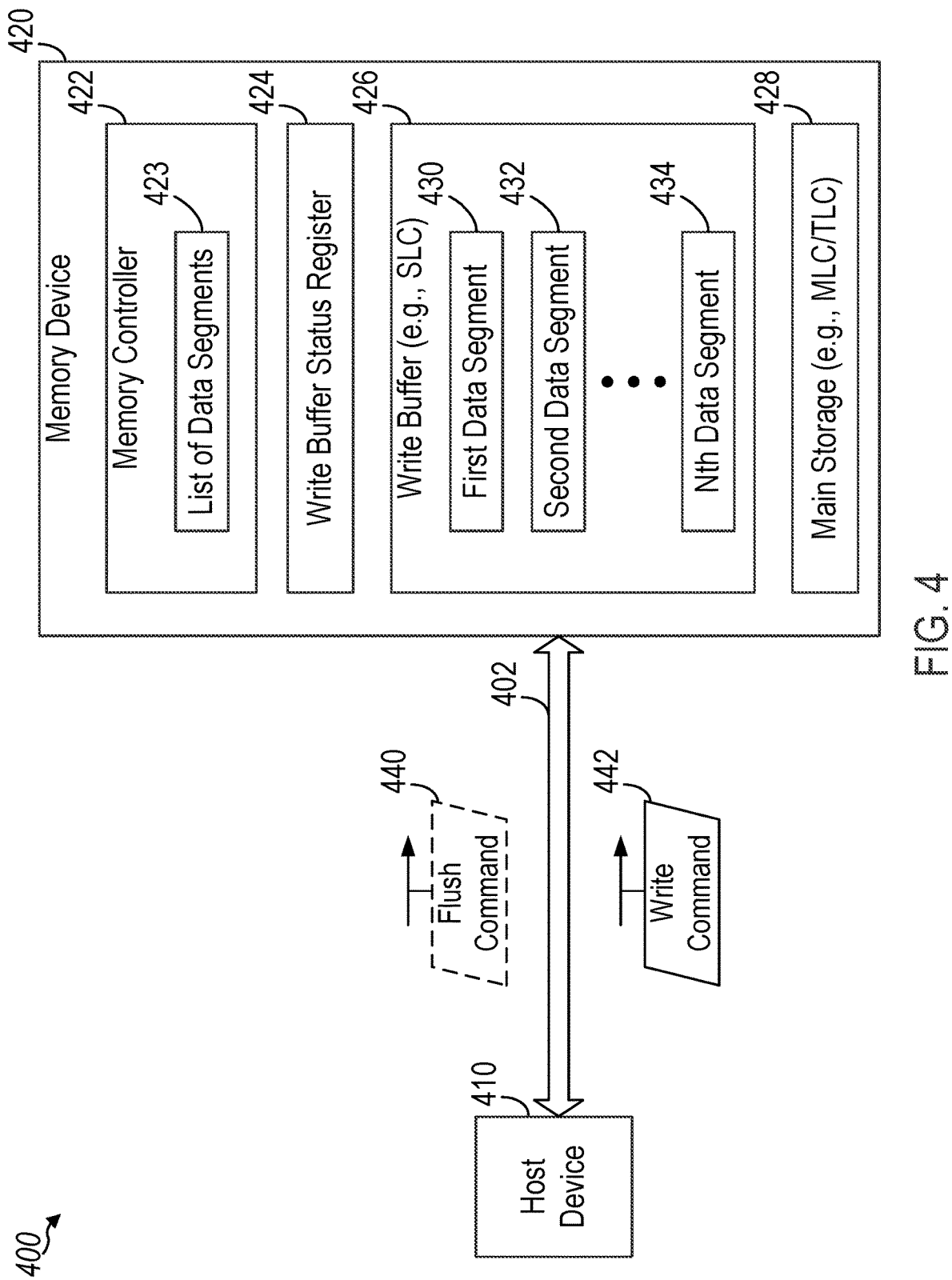
FIG. 4 is a block diagram illustrating an example of a memory system that supports an enhanced write buffer flush scheme for writing data to main storage capable of storing multiple bits of data per cell according to some embodiments of the disclosure.

The operations and capabilities described above may be used for a memory system that supports an enhanced write buffer scheme that improves throughput of memory devices that include high density main storage capable of storing multiple bits of data per memory cell. Referring to FIG. 4, a block diagram of an example of a memory system that supports an enhanced write buffer flush scheme for writing data to main storage capable of storing multiple bits of data per cell according to some embodiments of the disclosure is shown as memory system 400. Memory system 400 may include or correspond to data processing system 100 of FIG. 1, electronic device 200 (or portions thereof), host device 102 and memory system 110 of FIG. 3 (or components thereof), or a combination thereof. Memory system 400 may be a flash memory system configured to operate according to a UFS standard (e.g., memory device 420 may be configured as a UFS device). Memory system 400 includes a host device 410 coupled to a memory device 420 by an interface 402. Although shown as distinct components, in other implementations, memory device 420 may be included in or integrated within host device 410. For example, host device 410 may include or correspond to a user equipment (UE), a computing device, a desktop computing device, a laptop computing device, a tablet computing device, a mobile phone, a smart phone, a media playback device, a gaming device, an augmented reality (AR) device, a virtual reality (VR) device, an extended reality (XR) device, an internet of things (IoT) device, a smart device, a vehicular device or module, or a combination thereof, and memory device 420 may include or correspond to components of host device 410.

Memory device 420 may include a variety of components (such as structural, hardware components) used for carrying out one or more functions described herein. For example, these components may include memory controller 422, write buffer status register 424, write buffer 426, and main storage 428. Memory controller 422 may include one or more processors, microprocessors, or other hardware components that are configured to perform operations described herein for facilitating communications between host device 410 and memory device 420, and for accessing data at, and writing data to, write buffer 426 and main storage 428. Memory controller 422 may execute one or more instructions stored in memory to perform the operations described herein, and memory controller 422 may store information and data obtained during operation in one or more registers at memory device 420. For example, memory controller 422 may be configured to implement one or more registers, such as write buffer status register 424, which is configured to store status information related to write buffer 426.

Memory device 420 may be configured to store data for use by host device 410, such as at write buffer 426, main storage 428, or both. Write buffer 426 may include a portion of storage cells of memory device 420 that are configured to store one bit of data per storage cell, and main storage 428 may include a portion of storage cells (e.g., a memory module) of memory device 420 that are configured to store multiple bits of data per storage cell. As such, main storage 428 may be referred to as having a higher storage density than write buffer 426. For example, write buffer 426 may include a single-level cell (SLC) memory architecture, and main storage 428 may include a multi-level cell (MLC) memory architecture (e.g., each storage cell may be configured to store two bits of data) or a triple-level cell (TLC) memory architecture (e.g., each storage cell may be configured to store three bits of data), as non-limiting examples. In other implementations, the memory architecture of main storage 428 may be configured to store more than three bits of data per storage cell. Because write buffer 426 has a SLC memory architecture, write buffer 426 may provide faster write and erase speeds, higher endurance, and better reliability than main storage 428, although main storage 428 may provide higher storage density than write buffer 426. In some implementations, write buffer 426 is configured to implement a WriteBooster feature that enhances the write performance of NAND memory by acting as a dedicated buffer that temporarily stores data before being written to main storage 428, allowing for faster write operations. The WriteBooster feature can be configured in different ways, including the type of buffer (e.g., lookup (LU)-based or shared), buffer size, and user space reduction mode.

During operation of memory system 400, memory controller 422 may maintain list 423 of data segments stored in write buffer 426. List 423 may include, for each entry, a data segment identifier of a respective data segment stored at write buffer 426 and an amount of available contiguous memory space in write buffer 426 if the data segment is flushed (e.g., removed). For example, write buffer 426 may store a first data segment 430, a second data segment 432, and an Nth data segment 434, and list 423 may include entries that correspond to each of data segments 430, 432, and 434. In such an example, an entry of list 423 that corresponds to first data segment 430 includes an identifier that is associated with first data segment 430 and an amount of available contiguous memory space in write buffer 426 if first data segment 430 is cleared from write buffer 426 (also referred to as a "potential available contiguous memory space"). List 423 may include similar entries for second data segment 432 and Nth data segment 434. Although three data segments are shown as being stored in write buffer 426 in FIG. 4, in other implementations, write buffer 426 may store fewer than three or more than three data segments (e.g., N may be fewer than three or greater than three).

As data segments are cleared from write buffer 426, and new data entries are written to write buffer 426, the data stored in write buffer 426 may become fragmented, such that consecutive stored data segments are separated by different amounts of memory space. For example, if three data segments are initially stored with no intervening memory space between the data segments, as time progresses, two of the data segments may be flushed and removed from write buffer 426, and one or more new data segments of different sizes may be written to a portion of write buffer 426 that previously stored the two data segments. If the new data segments are smaller than the two previously stored data segments, and are different sizes than each other, than at least some of the memory space that previously stored the two original data segments may remain unused after storage of the two new data segments, and the amount of memory space between each pair of data segments may be different. As such, flushing the largest data segment from write buffer 426 at any given time may not result in freeing up the most contiguous memory space, because the space between two small data segments may be larger than the largest data segment, and thus flushing one of the smaller data segments may provide more available contiguous memory space in write buffer 426. Thus, fragmentation of data stored in write buffer 426 may make it difficult to clear sufficient contiguous memory space in write buffer 426 for new data segments using conventional time-based flushing schemes (e.g., according to a FIFO scheme) or size-based flushing schemes.

Instead, memory controller 422 may analyze write buffer 426 and determine, for each data segment stored in write buffer 426, an amount of available contiguous memory space if the respective data segment is flushed (e.g., removed or cleared). Analyzing write buffer 426 may include identifying data segments 430-434 stored in write buffer 426 and, for each data segment, calculating an available contiguous memory space in write buffer 426 if the data segment is flushed. The potential available contiguous memory space associated with a data segment includes an amount memory space between an ending location associated with a previous data segment stored in write buffer 426 and a starting location associated with a next data segment stored in write buffer 426. For example, if first data segment 430 has a starting location of #0000 (e.g., it is stored starting at the first location in write buffer 426) and a size of 20 megabytes (MB), with 980 MB of intervening free memory space between an end location of first data segment 430 and a start location of second data segment 432 at #1000, an amount of available contiguous memory space if first data segment 430 is flushed is 1 gigabyte (GB) (e.g., the amount of memory space between the start locations of first data segment 430 and second data segment 432). Stated another way, the amount of available contiguous memory space is equal to the same of the available contiguous memory space preceding first data segment 430, the size of first data segment 430, and the available contiguous memory space following first data segment 430. As another example, if second data segment 432 has a size of 500 MB, with 980 MB of intervening free contiguous memory space between the end location of first data segment 430 and a start location of second data segment 432, and with 20 MB of intervening free contiguous memory space between an end location of second data segment 432 and a start location of Nth data segment 434, an amount of available contiguous memory space if second data segment 432 is flushed is 1.5 GB. Amounts of available contiguous memory space for other data segments in write buffer 426 may be similarly determined. Additional examples of determining available contiguous memory space if data segments are cleared are described further herein with reference to FIG. 5. After determining the amount of available contiguous memory space associated with a data segment, memory controller 422 may add the determined available contiguous memory space to an entry in list 423 of the respective data segment. In the above examples, an entry associated with first data segment 430 may include an identifier of first data segment 430 and 1 GB as the value of the available contiguous memory space if first data segment 430 is flushed, and an entry associated with second data segment 432 may include an identifier of second data segment 432 and 1.5 GB as the value of the available contiguous memory space if second data segment 432 is flushed.

After populating list 423 with entries associated with data segments 430-434 stored in write buffer 426, memory controller 422 may sort list 423 based on the available contiguous memory space associated with each entry. In some implementations, memory controller 422 sorts list 423 in descending order, such that a first entry in list 423 is associated with a data segment that, when flushed from write buffer 426, results in the largest amount of available contiguous memory space in write buffer 426. For example, Table 1 below provides an example of entries of list 423 prior to sorting, and Table 2 below provides an example of entries of list 423 after sorting based on the available contiguous memory space included in the entries.

TABLE 1

List of Data Segments in Write Buffer (Prior to Sort)

| Segment ID | Available Contiguous Memory Space After Flush |
|---|---|
| Seg_001 | 1.0 GB |
| Seg_002 | 1.5 GB |
| Seg_003 | 1.2 GB |

TABLE 2

List of Data Segments in Write Buffer (Sorted)

| Segment ID | Available Contiguous Memory Space After Flush |
|---|---|
| Seg_002 | 1.5 GB |
| Seg_003 | 1.2 GB |
| Seg_001 | 1.0 GB |

In some implementations, each entry of list 423 also includes a size of the respective data segment, a start location and an end location of the respective data segment, or a combination thereof. For example, memory controller 422 may record a size of each data segment stored at write buffer 426 in a particular field of entries of list 423. Additionally or alternatively, a start location and an end location of each data segment may be similarly stored in particular fields of list 423. In such implementations, if two entries in list 423 have the same value for available contiguous memory space, the entries may be further sorted based on the size. In some implementations, the sorting based on size may be in increasing order (e.g., the first entry has the smallest size) because smaller entries are capable of being flushed faster, and therefor less likely to be interrupted by write commands. In some other implementations, the sorting based on size may be in decreasing order (e.g., the first entry has the largest size), such as when other commands are not expected to be received, in order to flush the largest data segments first and free up more additional memory space. Additionally or alternatively, each entry of list 423 may also include a timestamp associated with storage of the respective data segment in write buffer 426, and if two entries in list 423 have the same value for available contiguous memory space and the same size, the entries may be further sorted based on the timestamp. For example, the entries may be sorted in increasing order based on time, such that the first entry in list 423 is associated with an earliest timestamp, in order to flush the oldest entries from write buffer 426 if they would free up the same amount of contiguous memory space and have the same size. Alternatively, memory controller 422 may sort list 423 based on timestamp before sorting based on size, if design considerations favor flushing older data above flushing particularly sized data segments.

In addition to maintaining list 423, memory controller 422 may monitor to detect a flush opportunity associated with write buffer 426. Memory controller 422 may be configured to detect a flush opportunity based on a command from host device 410 or based on a status of interface 402. For example, memory controller 422 may detect a flush opportunity by detecting a flush command 440 sent from host device 410 to memory device 420 via interface 402. In some implementations, in accordance with a memory standard such as a UFS standard, memory device 420 may inform host device 410 when a WriteBooster buffer (e.g., write buffer 426) is full or near full using an exception event, and host device 410 may send flush command 440 based on receiving the exception event. As another example, memory controller 422 may detect a flush opportunity by detecting a connection to host device 410 via interface 402 is dormant. Dormancy of interface 402 may be detected if a time period in which no communication is performed between host device 410 and memory device 420 via interface 402 satisfies a threshold, if an idle signal is detected via interface 402, if a standby command is received from host device 410, if a detected energy level associated with interface 402 falls below a threshold, or in any other manner of detecting that interface 402 between host device 410 and memory device 420 has become dormant.

Based on detection of the flush opportunity, memory controller 422 may initiate a flush operation to write a data segment from write buffer 426 to main storage 428. The data segment that is flushed corresponds to a first entry of list 423. For example, if the first entry of list 423 (e.g., after being sorted) includes an identifier of second data segment 432, memory controller 422 may initiate a flush operation to write second data segment 432 from write buffer 426 to main storage 428. If the flush operation is performed to completion without being interrupted by another operation (as further described below), memory controller 422 may delete second data segment 432 from write buffer 426. For example, if memory controller 422 receives an indication from main storage 428 that second data segment 432 has been successfully stored at main storage 428, memory controller 422 may delete second data segment 432, such as by erasing the data segment or otherwise marking that the memory space that previously stored second data segment 432 is now available to store new data. After deleting second data segment 432 from write buffer 426, memory controller 422 may update list 423 to delete the first entry (e.g., the entry that is associated with second data segment 432), and re-sort list 423 such that a second entry of list 423 is now be located at the front of list 423. In this manner, after the data segment associated with the largest available contiguous memory space is flushed from write buffer 426, list 423 is updated and re-sorted to cause the data segment associated with the next largest amount of available contiguous memory space in write buffer 426 to be located at the front of list 423.

If memory controller 422 receives a write command to store new data in write buffer 426 after performance of the flush operation, the intervening memory space between first data segment 430 and second data segment 432, the space in which second data segment 432 was previously stored, and the intervening space between second data segment 432 and Nth data segment 434 may be available for storing the new data, in addition to any other available memory space in write buffer 426. Memory device 420 may receive a write command 442 from host device 410, and memory controller 422 may write a new data segment indicated by or included in write command 442 to write buffer 426. After the new data segment is written to write buffer 426, memory controller 422 may add a new entry associated with the new data segment to list 423 and, after the new entry is added, memory controller 422 may update one or more entries of list 423 based on changes to the respective available contiguous memory space of some entries caused by adding the new data segment to write buffer 426. For example, if the new data segment is stored such that a start location of the new data segment immediately follows the end location of first data segment 430, the entry associated with first data segment 430 may be updated to modify the value of the available contiguous memory space to be equal to the size of first data segment 430. This is because, if the start location of first data segment 430 is the first location in write buffer 426 (as in the examples described above), there is no available memory space before first data segment 430, and if the start location of the new data segment immediately follows the end location of first data segment 430, there is no intervening available memory space between first data segment 430 and the new data segment—as such, the only memory space that will be freed by flushing first data segment 430 is the memory space that currently stores first data segment 430. Additionally, the entry associated with Nth data segment 434 may be updated, because the amount of intervening available contiguous memory space before Nth data segment 434 may be different if the end location of the new data segment is different than the end location of second data segment 432. After memory controller 422 adds the new entry to list 423 and updates any entries in list 423 affected by the storage of the new data segment in write buffer 426, memory controller 422 may re-sort list 423 based on the available contiguous memory space associated with each entry, such that the first entry in list 423 is associated with the data segment that corresponds to the largest available contiguous memory space for the state of write buffer 426 at this point in time. Although described herein as being re-sorted after every addition of a new entry or deletion of an entry, in some other implementations, memory controller 422 may re-sort list 423 periodically (e.g., after a particular time period has lapsed), when a number of changes to list 423 satisfies a threshold, or according to any other scheme that results in sufficient updating of list 423 that efficient flushing of large data segments from write buffer 426 is performed.

However, if another command is received during performance of the flush operation, memory controller 422 may pause performance of the flush operation to perform the newly received command if the command has higher priority. For example, if memory device 420 receives write command 442 from host device 410 during performance of the flush operation associated with second data segment 432, memory controller 422 may pause performance of the flush command, resulting in a portion of second data segment 432 being stored at main storage 428 and a remainder of second data segment 432 still being stored at write buffer 426. After pausing the performance of the flush operation, memory controller 422 may perform a write operation to write a new data segment indicated by write command 442 to write buffer 426, similar to as described above. After the new data segment is stored in write buffer 426, memory controller 422 may add a new entry that corresponds to the new data segment to list 423. After the new data segment is stored at write buffer 426 and the new entry is added to list 423 (e.g., completion of the write operation), memory controller 422 may initiate a second flush operation (e.g., also referred to or described as a partial flush operation) to write the remainder of second data segment 432 from write buffer 426 to main storage 428. After completion of the second flush operation, memory controller 422 may delete the first entry (e.g., that corresponds to second data segment 432) from list 423 and update any entries based on the addition of the new data segment and the removal of second data segment 432. For example, memory controller 422 may traverse write buffer 426 and identify any changes to available contiguous memory space associated with removal of the data segments that is caused by removal of second data segment 432 or addition of the new data segment, which may include increasing or decreasing the available contiguous memory space value(s) of one or more entries of list 423. After deletion of the first entry and updating of any entries of list 423, memory controller 422 may re-sort list 423 based on the available contiguous memory space associated with each entry, such that the first entry in list 423 is associated with the data segment that corresponds to the largest available contiguous memory space for the state of write buffer 426 at this point in time. In this manner, although memory controller 422 may pause a flush operation to perform a write operation, the flush operation will be finished prior to performance of a next new flush operation, thereby preserving the ability of memory controller 422 to perform available contiguous memory-based flushing of write buffer 426.

In some implementations, the status of write buffer 426 with respect to performance of flush operations (or other operations) is provided by a value stored in write buffer status register 424. For example, one or more bits of write buffer status register 424 may indicate a type of flush operation that is being performed at write buffer 426. The type of flush operation may include a standard flush operation (e.g., a FIFO or time-based flush operation), a partial flush operation (e.g., a flush operation that has been paused or interrupted by a write operation), or an available contiguous memory space-based flush operation (e.g., a flush operation in accordance with list 423). In some implementations, in accordance with a memory standard such as a UFS standard, write buffer status register 424 may store an eight bit numerical value, of which four bits indicate the status of a flush operation with respect to write buffer 426 (e.g., that there no flush has been initiated, that a flush operation is in progress, that a flush operation was stopped prematurely, that a flush operation was completed successfully, or a flush operation general failure), and two bits indicate what type of flush operation is being performed: the standard flush operation (e.g., a traditional flush operation), the partial flush operation, or the available contiguous memory-space based flush operation (e.g., a selective flush operation). In some such implementations, the four least significant bits of the value in write buffer status register 424 may be used to indicate the status of write buffer 426 and the next two least significant bits of the value may be used to indicate the type of flush operation. In other operations, the eight bits may be allocated differently, or the write buffer status register 424 may store fewer than eight bit values or greater than eight bit values. When memory controller 422 detects a flush opportunity or receives a flush command, memory controller 422 may access write buffer status register 424 to determine a status of write buffer 426, and whether a flush operation can be performed at this time.

As described above with reference to FIG. 4, memory system 400 supports improved throughput of writing to memory device 420, particularly to main storage 428 that is capable of storing multiple bits of data per cell. Such improved throughput may be achieved by leveraging write buffer 426 (e.g., a Turbo Write/WriteBooster Buffer) that includes an SLC memory architecture, as compared to the MLC or TLC memory architecture of main storage 428, and an enhanced write buffer flush scheme for write buffer 426. For example, write buffer 426 may be configured to cache entries to be written to the higher-density memory portion (e.g., main storage 428), and entries from write buffer 426 may be flushed to main storage 428 based on list 423. Memory controller 422 may maintain list 423 and continuously monitor the availability of contiguous memory space in write buffer 426, thus providing dynamic space management. maintained by memory controller 422. Instead of flushing entries according to a first in, first out (FIFO) scheme, memory controller 422 may sort list 423 based on the amount of contiguous memory space that is freed up by clearing the respective data segment from write buffer 426. In this manner, the write buffer flush scheme implemented by memory controller 422 may optimize the amount of available contiguous memory space in write buffer 426 after each flush operation (e.g., prioritize the flushing of data segments that result in larger contiguous memory blocks, thereby improving overall efficiency and performance of memory system 400). For example, each time a flush operation is performed, the maximum possible amount of contiguous storage in write buffer 426 is achieved, which reduces the likelihood that a new data segment included in write command 442 will be unable to fit in write buffer 426 and thus be written directly to main storage 428. Reducing the amount of write operations performed directly to main storage 428 improves the throughput of memory system 400, particularly as the data stored in write buffer 426 becomes more fragmented during operation of memory system 400.

Figure 5:
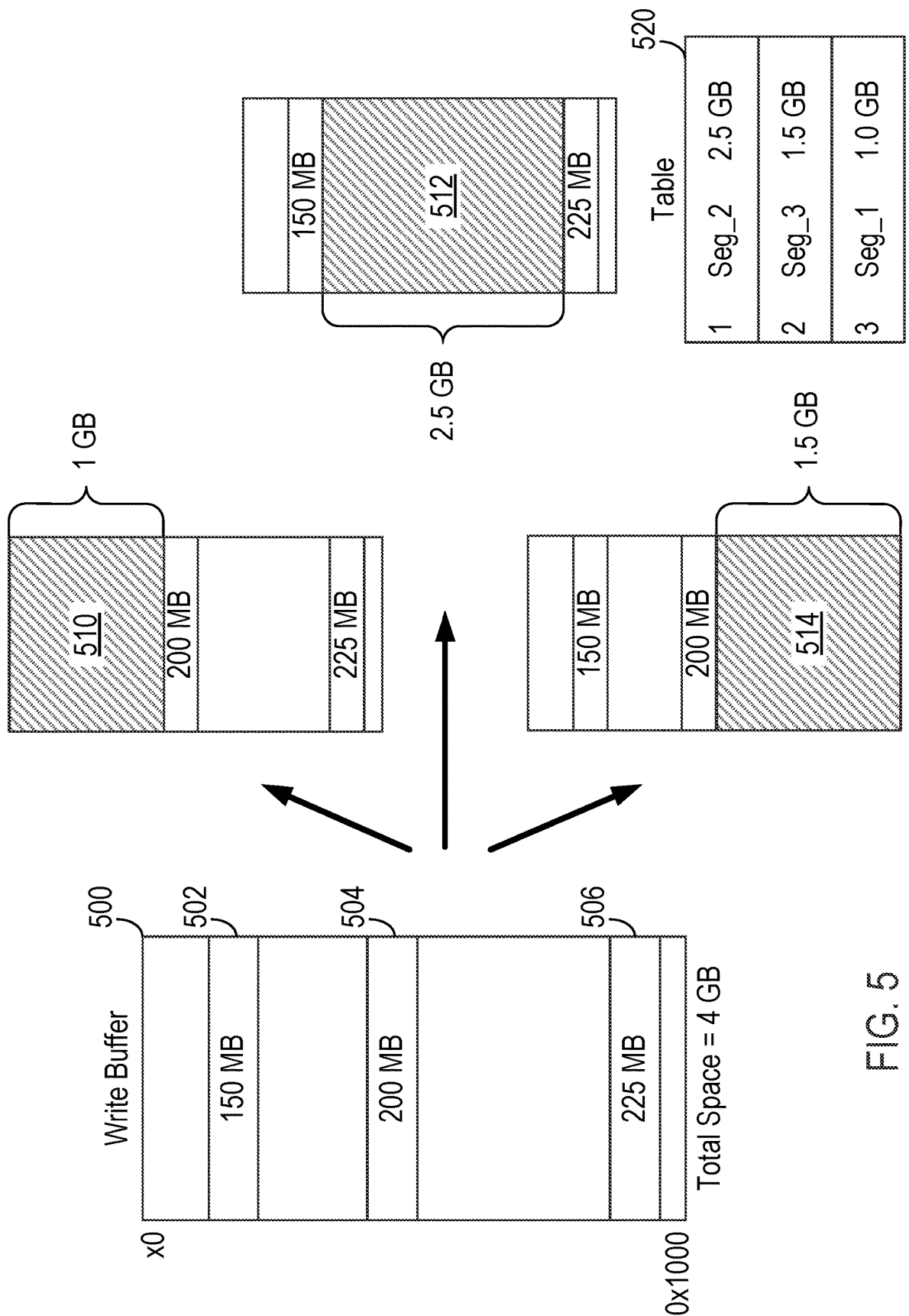
FIG. 5 is an example of a write buffer that undergoes an enhanced write buffer flush scheme according to some embodiments of the disclosure.

FIG. 5 is an example of a write buffer 500 that undergoes an enhanced write buffer flush scheme according to some embodiments of the disclosure. In some implementations, write buffer 500 may include or correspond to write buffer 426 of FIG. 4. Write buffer 500 may be capable of storing four GB of data and may be assigned an address space from x0 to x1000. At a particular time, write buffer 500 may store three data segments: a first data segment 502, a second data segment 504, and a third data segment 506. In the example illustrated in FIG. 5, a size of first data segment 502 is 150 MB, a size of second data segment 504 is 200 MB, and a size of third data segment 506 is 225 MB. Because of fragmenting of data during the operation of write buffer 500, there is available contiguous memory space between a start address of write buffer 500 and a start address of first data segment 502, between an end address of first data segment 502 and a start address of second data segment 504, between an end address of second data segment 504 and a start address of third data segment 506, and between an end address of third data segment 506 and an end address of write buffer 500.

FIG. 5 illustrates examples of flushing each of the data segments 502-506 to show the available contiguous memory space that is freed by the respective flushing operation. In a first example, flushing first data segment 502 results in first available contiguous memory space 510 that is 1 GB (e.g., there is 1 GB of available contiguous memory space between the start address of write buffer 500 and the start address of second data segment 504). In a second example, flushing second data segment 504 results in second available contiguous memory space 512 that is 2.5 GB (e.g., there is 2.5 GB of available contiguous memory space between the end address of first data segment 502 and the start address of third data segment 506). In a third example, flushing third data segment 506 results in third available contiguous memory space 514 that is 1.5 GB (e.g., there is 1.5 GB of available contiguous memory space between the end address of second data segment 504 and the end address of write buffer 500). Accordingly, a list 520 of data segments stored in write buffer 500 includes three entries: an entry that identifies first data segment 502 ("Seg_1") and 1.0 GB of potential available contiguous memory space, an entry that identifies second data segment 504 ("Seg_2") and 2.5 GB of potential available contiguous memory space, and an entry that identifies third data segment 506 ("Seg_3") and 1.5 GB of potential available contiguous memory space.

As described above with reference to FIG. 4, list 520 may be sorted based on the potential available contiguous memory space of each entry. In some implementations, the sorting is in descending order. For example, after the sorting, list 520 may include entries in the following order: Seg_2 (2.5 GB), Seg_3 (1.5 GB), and Seg_1 (1.0 GB). As such, the next flush operation performed based on list 520 will be to flush second data segment 504 from write buffer 500. This flush operation will free 2.5 GB of contiguous memory space to be available for storing new data segments written to write buffer 500. In this manner, write buffer 500 and list 520 support dynamic space management using an available contiguous memory space-based flushing scheme (e.g., a selective flushing scheme) to improve throughput of a memory device.

Figure 6:
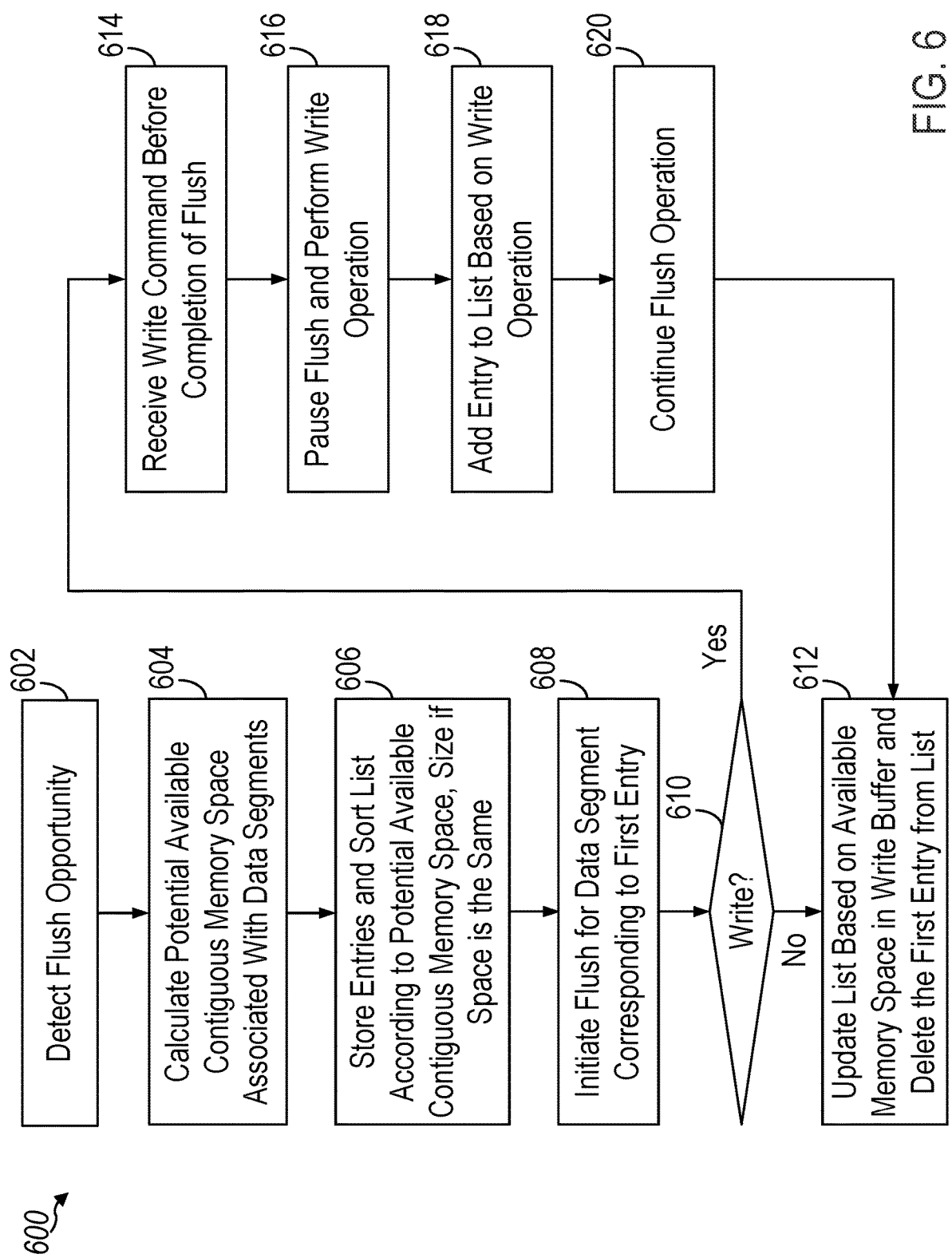
FIG. 6 is a flow chart illustrating a method for an enhanced write buffer flush scheme for writing data to main storage capable of storing multiple bits of data per cell according to some embodiments of the disclosure.

FIG. 6 is flow chart illustrating a method for an enhanced write buffer flush scheme for writing data to main storage capable of storing multiple bits of data per cell according to some embodiments of the disclosure. In some implementations, the method may be performed by controller 130 of memory system 110 of FIG. 1, storage system 250 of FIG. 2, memory system 110 of FIG. 3, or memory controller 422 of memory device 420 of FIG. 4. A method 600 includes, at block 602, receiving, by a memory controller of a memory device or system (e.g., a flash memory device), detecting a flush opportunity. For example, the flush opportunity may be detected by detecting receipt, by the memory device, of a flush command from a host device or by detecting that an interface that couples the memory device to the host device is dormant. At block 604, method 600 includes calculating, by the memory controller, potential available contiguous memory space associated with data segments stored in a write buffer. For example, if the write buffer stores a data segment that is preceded in the write buffer by a prior data segment (and optionally intervening free memory space between the prior data segment and the data segment) and that is followed in the write buffer by a subsequent data segment (and optionally intervening free memory space between the data segment and the subsequent data segment), the memory controller may calculate the potential available contiguous memory space if the data segment is flushed from the write buffer as an amount of memory space between an end address of the prior data segment and a start address of the subsequent data segment. Additional examples of calculating potential available contiguous memory space associated with data segments are described above, with reference to FIG. 5.

At block 606, method 600 includes storing, by the memory controller, entries in a list of data segments and sorting the list according to potential available contiguous memory space. For example, the potential available contiguous memory space values calculated as described above may be stored with identifiers of the corresponding data segments, and optionally sizes, of the data segments, timestamps associated with the data segments, or both, as entries in the list. The list may be sorted such that the first entry includes the largest potential available contiguous memory space value, as described above with reference to Table 1 and Table 2. In some implementations, if a subset of entries (e.g., two or more entries) of the list have the same potential available contiguous memory space values, the subset of entries may be further sorted based on size (e.g., in ascending order), based on timestamp, or a combination thereof. Although operations described with reference to blocks 604-606 are described as being performed after operations described with reference to block 602, in other implementations, the operations described with reference to blocks 604-606 may be performed periodically or at other times that occur before the operations described with reference to block 602, without departing from the techniques of the present disclosure. At block 608, method 600 includes initiating, by the memory controller and based on (e.g., responsive to) detecting the flush opportunity, a flush operation for a data segment in the write buffer that corresponds to a first entry in the list. For example, the memory controller may initiate a flush operation at the write buffer to flush the data segment identified by the first entry of the list as being associated with the largest potential available contiguous memory value from the write buffer. The flush operation may include writing the data segment to main storage (e.g., a memory module) that has a higher density memory architecture that is capable of storing more bits per storage cell than the write buffer. For example, the write buffer may have a SLC memory architecture and the main storage may have a MLC memory architecture or a TLC memory architecture, or any other type of memory architecture capable of storing two or more bits per storage cell.

At block 610, method 600 includes determining, by the memory controller, whether a write command is received from the host device during performance of the flush operation. For example, the memory controller may determine whether the memory device receives a write command via the interface prior to completion of the flush operation. If no write command is received during performance of the flush operation (e.g., the flush operation is successfully completed without the memory device receiving a write command), method 600 continues to block 612, and the memory controller updates the list based on changes to potential available contiguous memory space in the write buffer due to the removal (e.g., flushing) of the data segment. The memory controller may also delete the first entry from the list once the corresponding data segment has been flushed from the write buffer.

If a write command is received during performance of the flush operation (e.g., the flush operation is not successfully completed prior to the memory device receiving a write command), method 600 proceeds to block 614, and the memory controller receives and processes the write command before completion of the flush operation. The write command may be prioritized over flush operations in order to reduce or prevent a decrease in throughput experienced by the host device. At block 616, method 600 includes pausing, by the memory controller, the flush operation and performing a write operation. For example, the memory controller may pause performance of the flush operation when a portion of the data segment is written to the main storage and a remainder of the data segment remains stored in the write buffer. After pausing the flush operation, the memory controller may perform a write operation to write a new data segment indicated by the write command to available memory space at the write buffer. At block 618, method 600 includes Adding, by the memory controller, an entry to the list that corresponds to the new data segment resulting from the write operation. For example, the memory controller may calculate a potential available contiguous memory space associated with the new data segment, and the calculated value and an identifier of the new data segment may be added to the list as a new entry. At block 620, method 600 includes continuing (e.g., unpausing), by the memory controller, the paused flush operation. For example, the memory controller may initiate a second flush operation (e.g., a partial flush operation) to flush the remainder of the data segment from the write buffer to the main storage. After completion of the operations of block 620, method 600 proceeds to block 612, and the memory controller updates the list based on changes to potential available contiguous memory space in the write buffer due to the removal (e.g., flushing) of the data segment and the addition of the new data segment. The memory controller may also delete the first entry from the list once the corresponding data segment has been flushed from the write buffer. In some implementations, the memory controller may resort the list after the update, to sort the list in order of largest potential available contiguous memory space values. Alternatively, the sorting may occur after a next flush operation is detected, as described with reference to block 606. The memory controller may then monitor for a next flush condition, and if one is detected, method 600 returns to block 602.

FIG. 7 is a flow chart illustrating a method for an enhanced write buffer flush scheme for writing data to main storage capable of storing multiple bits of data per cell by a flash memory system according to some embodiments of the disclosure. In some implementations, the method may be performed by controller 130 of memory system 110 of FIG. 1, storage system 250 of FIG. 2, memory system 110 of FIG. 3, or memory controller 422 of memory device 420 of FIG. 4. A method 700 includes, at block 702, maintaining, by the memory controller for a memory system that includes a write buffer having a SLC memory architecture and a memory module having a higher density storage density memory architecture than the write buffer, a list of data segments stored in the write buffer. For example, the write buffer may include or correspond to write buffer 426 of FIG. 4, and the memory module may include or correspond to main storage 428 of FIG. 4. In some implementations, the memory module has MLC memory architecture or a TLC memory architecture. The list includes, for each entry of the list, a data segment identifier of a respective data segment and an available contiguous memory space in the write buffer if the data segment is flushed (e.g., a potential available contiguous memory space), and the list may be sorted based on the available contiguous memory space, the write buffer may have an SLC memory architecture. For example, the list may include or correspond to list 423 of FIG. 4. In some implementations, the memory system (or a memory device thereof) includes a flash memory device configured as a UFS device.

At block 704, method 700 includes detecting, by the memory controller, a flush opportunity associated with the write buffer. For example, the memory controller may detect a flush command (e.g., flush command 440 of FIG. 4) or an interface (e.g., interface 402) with the host device may become dormant. At block 706, method 700 includes initiating, by the memory controller based on detection of the flush opportunity, a flush operation to write a first data segment from the write buffer to the memory module. The first data segment corresponds to a first entry of the list. For example, the first data segment may include or correspond to one of data segments 430, 432, or 434 of FIG. 4 that corresponds to the first entry of list 423.

In some implementations, method 700 further includes, after completion of the flush operation, deleting the first entry from the list. For example, after flushing one of data segments 430-434 associated with a first entry of list 423, memory controller 422 of FIG. 4 may delete the first entry from list 423. Additionally, or alternatively, method 700 may also include identifying one or more data segments stored in the write buffer and, for each of the one or more data segments: calculating the available contiguous memory space in the write buffer if the data segment is flushed and adding the available contiguous memory space to a corresponding entry of the list. Examples of calculating potential available contiguous memory space are further describe above with reference to FIGS. 4-5. Additionally or alternatively, method 700 may further include sorting the list based on the available contiguous memory space associated with each entry, as described above with reference to FIGS. 4-5.

In some implementations, method 700 further includes receiving, from the host device, a write command associated with the write buffer, and writing, based on the write command, a new data segment to the write buffer. For example, the write command may include or correspond to write command 442 of FIG. 4. In some such implementations, method 700 also includes adding a new entry associated with the new data segment to the list, updating one or more entries of the list based on changes to the respective available contiguous memory space caused by adding the new entry, and re-sorting the list based on the available contiguous memory space associated with each entry, as further described above with reference to FIG. 4. In some such implementations, the write command is received after completion of the flush operation and the list is re-sorted after deletion of the first entry from the list.

In some other implementations, the write command is received prior to completion of the flush operation. In such implementations, method 700 may also include pausing performance of the flush operation upon receiving the write command. The flush operation has written a portion of the first data segment to the memory module (e.g., at the time of the pausing), as described above with reference to FIG. 4. In some such implementations, method 700 further includes initiating, after the new data segment is stored at the write buffer, a second flush operation to write a remainder of the first data segment from the write buffer to the memory module and, after completion of the second flush operation, deleting the first entry from the list. For example, memory controller 422 of FIG. 4 may perform a write operation to store a new data segment at write buffer 426, and after completion of the write operation, memory controller 422 may initiate a second flush operation to flush a remainder of the data segment stored at write buffer 426 (e.g., to write the remainder of the data segment to main storage 428). In this example, after completion of the second flush operation (e.g., a partial flush operation), memory controller 422 may delete the first entry associated with the flushed data segment from list 423. In some such implementations, method 700 may also include adding, after deletion of the first entry, a new entry associated with the new data segment to the list, updating one or more entries of the list based on changes to the respective available contiguous memory space caused by adding the new entry, and re-sorting the list based on the available contiguous memory space associated with each entry, as further described above with reference to FIG. 4.

In some implementations, each entry of the list further includes a size of the respective data segment or a start location and an end location of the respective data segment. For example, each entry of list 423 of FIG. 4 may include a size, or a start location (e.g., start address) and end location (e.g., end address) from which a size may be calculated, of the respective data segment. In some such implementations, sorting the list includes, for a subset of entries associated with the same available contiguous memory space, sorting the subset of entries in increasing order based on the size. For example, after list 423 of FIG. 4 is first sorted based on potential available contiguous memory space, a subset of entries of list 423 (e.g., entries with the same potential available contiguous memory space values) may be additionally sorted in ascending/increasing order based on size of the respective data segments. Additionally, or alternatively, each entry of the list may further include a timestamp associated with storage of the respective data segment in the write buffer. For example, each entry of list 423 of FIG. 4 may also include a timestamp that indicates when the respective data segment was stored at write buffer 426. In some such implementations, sorting the list includes, for a subset of entries associated with the same available contiguous memory space and the same size, sorting the subset of entries in decreasing order based on the timestamp. For example, after list 423 of FIG. 4 is first sorted based on potential available contiguous memory space (and optionally then sorted based on size), a subset of entries of list 423 (e.g., entries with the same potential available contiguous memory space values, and optionally the same size) may be additionally sorted in ascending/increasing order based on timestamp (e.g., in accordance with a FIFO scheme).

In some implementations, method 700 further includes accessing one or more bits of a flush status register associated with the write buffer to determine a type of flush operation being performed at write buffer. For example, the flush status register may include or correspond to write buffer status register 424 of FIG. 4. In some such implementations, the type of flush operation includes a standard flush operation, a partial flush operation, or an available contiguous memory space-based flush operation (e.g., a selective flush operation).

In some implementations, detecting the flush opportunity is based on receipt of a flush command from a host device. For example, the flush command may include or correspond to flush command 440 of FIG. 4. Additionally, or alternatively, detecting the flush opportunity is based on detecting a connection to the at least one processor via the first interface is dormant. For example, the first interface may include or correspond to the interface 402 of FIG. 4.

Figure 8:
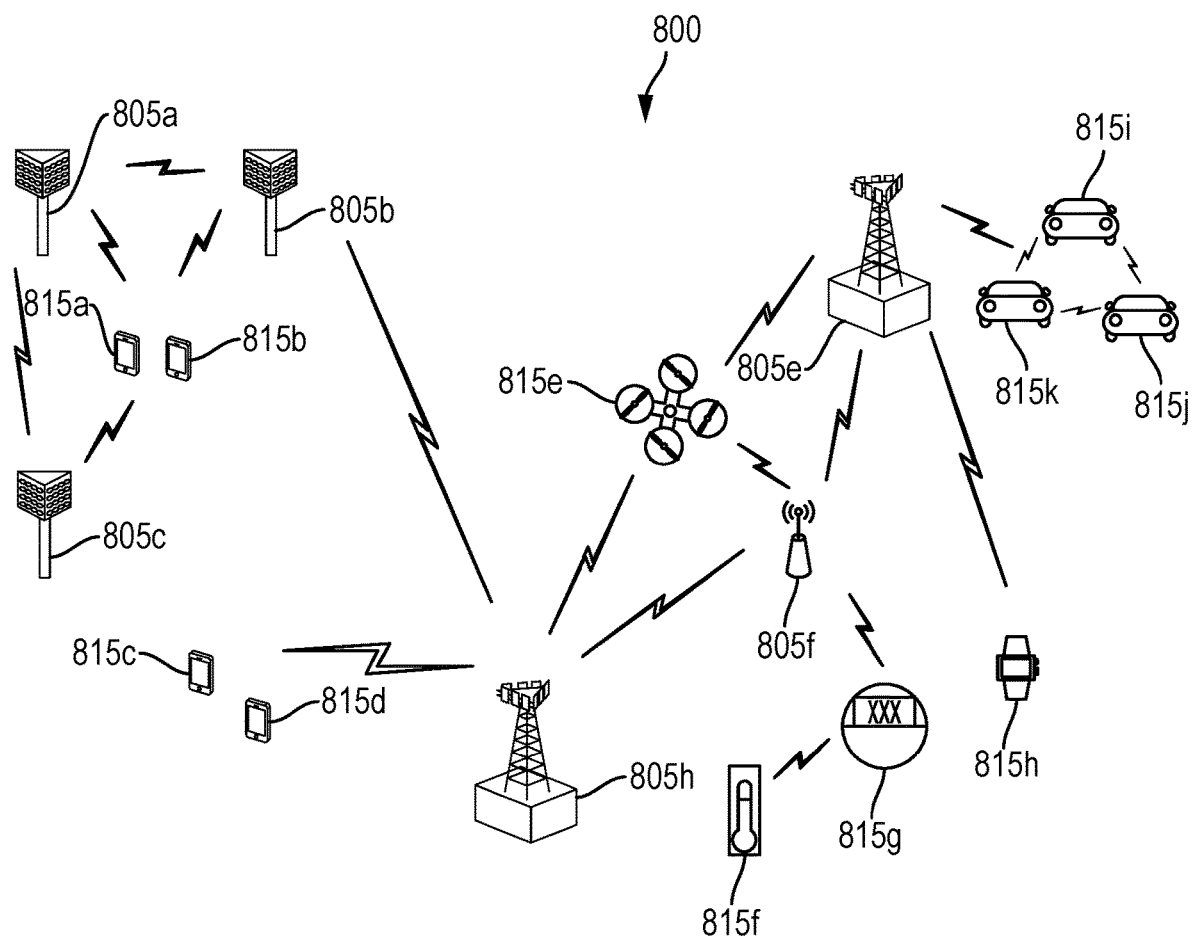
FIG. 8 is a block diagram illustrating details of an example wireless communication system according to one or more aspects.

Operations of method 600 or method 700 may be performed by a user equipment (UE), such as a UE described with reference to FIG. 8. For example, example operations (also referred to as "blocks") of method 600 or method 700 may enable UE 815 (e.g., a wireless communication device) to support an enhanced write buffer flush scheme for writing data to main storage capable of storing multiple bits of data per cell with improved throughput by optimizing available contiguous memory space in the write buffer after flush operations. FIG. 8 is a block diagram illustrating details of an example wireless communication system according to one or more aspects. The wireless communication system may include wireless network 800. Wireless network 800 may, for example, include a 5G wireless network. As appreciated by those skilled in the art, components appearing in FIG. 8 are likely to have related counterparts in other network arrangements including, for example, cellular-style network arrangements and non-cellular-style-network arrangements (e.g., device to device or peer to peer or ad hoc network arrangements, etc.).

Wireless network 800 illustrated in FIG. 8 includes a number of base stations 805 and other network entities. A base station may be a station that communicates with the UEs and may also be referred to as an evolved node B (eNB), a next generation eNB (gNB), an access point, and the like. Each base station 805 may provide communication coverage for a particular geographic area. In 3GPP, the term "cell" may refer to this particular geographic coverage area of a base station or a base station subsystem serving the coverage area, depending on the context in which the term is used. In implementations of wireless network 800 herein, base stations 805 may be associated with a same operator or different operators (e.g., wireless network 800 may include a plurality of operator wireless networks). Additionally, in implementations of wireless network 800 herein, base station 805 may provide wireless communications using one or more of the same frequencies (e.g., one or more frequency bands in licensed spectrum, unlicensed spectrum, or a combination thereof) as a neighboring cell. In some examples, an individual base station 805 or UE 815 may be operated by more than one network operating entity. In some other examples, each base station 805 and UE 815 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 8, base stations 805*d* and 805*e* are regular macro base stations, while base stations 805*a*-805*c* are macro base stations enabled with one of 3 dimension (3D), full dimension (FD), or massive MIMO. Base stations 805*a*-805*c* take advantage of their higher dimension MIMO capabilities to exploit 3D beamforming in both elevation and azimuth beamforming to increase coverage and capacity. Base station 805*f* is a small cell base station which may be a home node or portable access point. A base station may support one or multiple (e.g., two, three, four, and the like) cells.

Wireless network 800 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 815 are dispersed throughout the wireless network 800, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 815, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 815a-815d of the implementation illustrated in FIG. 8 are examples of mobile smart phone-type devices accessing wireless network 800. A UE may also be a machine specifically configured for connected communication, including machine type communication (MTC), enhanced MTC (eMTC), narrowband IoT (NB-IoT) and the like. UEs 815e-815k illustrated in FIG. 8 are examples of various machines configured for communication that access wireless network 800.

A mobile apparatus, such as UEs 815, may be able to communicate with any type of the base stations, whether macro base stations, pico base stations, femto base stations, relays, and the like. In FIG. 8, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 800 may occur using wired or wireless communication links.

In operation at wireless network 800, base stations 805a-805c serve UEs 815a and 815b using 3D beamforming and coordinated spatial techniques, such as coordinated multipoint (CoMP) or multi-connectivity. Macro base station 805d performs backhaul communications with base stations 805a-805c, as well as small cell, base station 805f. Macro base station 805d also transmits multicast services which are subscribed to and received by UEs 815c and 815d. Such multicast services may include mobile television or stream video, or may include other services for providing community information, such as weather emergencies or alerts, such as Amber alerts or gray alerts.

Wireless network 800 of implementations supports mission critical communications with ultra-reliable and redundant links for mission critical devices, such UE 815e, which is a aeronautical vehicle. Redundant communication links with UE 815e include from macro base stations 805d and 805e, as well as small cell base station 805f. Other machine type devices, such as UE 815f (thermometer), UE 815g (smart meter), and UE 815h (wearable device) may communicate through wireless network 800 either directly with base stations, such as small cell base station 805f, and macro base station 805e, or in multi-hop configurations by communicating with another user device which relays its information to the network, such as UE 815f communicating temperature measurement information to the smart meter, UE 815g, which is then reported to the network through small cell base station 805f. Wireless network 800 may also provide additional network efficiency through dynamic, low-latency TDD communications or low-latency FDD communications, such as in a vehicle-to-vehicle (V2V) mesh network between UEs 815i-815k communicating with macro base station 805e.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

In some implementations, devices of wireless network 800 may include or access a memory system, such as a flash memory system, described above with reference to FIGS. 1-4. As non-limiting examples, UEs 815 may include or correspond to host device 102 of FIGS. 1 and 3, and memory system 110 of FIGS. 1 and 3 may include or correspond to storage devices that are integrated in UEs 815 or that are removably coupled to UEs 815, such as a SSD, a MMC, an eMMC, a RS-MMC, a micro-MMC, a SD card, a mini-SD, a micro-SD, a USB storage device, a UFS device, a CF card, a SM card, or a memory stick. Additionally, or alternatively, base stations 805 may include or correspond to host device 102 of FIGS. 1 and 3, and memory system 110 of FIGS. 1 and 3 may include or correspond to storage devices that are integrated in base stations 805 or that are removably coupled to base stations 805, such as a SSD, a MMC, an eMMC, a RS-MMC, a micro-MMC, a SD card, a mini-SD, a micro-SD, a USB storage device, a UFS device, a CF card, a SM card, or a memory stick.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage, data transmission, and/or an enhanced write buffer flush scheme for writing data to main storage capable of storing multiple bits of data per cell may include additional aspects, such as any single aspect or any combination of aspects described below or in connection with one or more other processes or devices described elsewhere herein. In a first aspect, an electronic device, such as a UE, may be an apparatus that includes, operates as, or is coupled to a memory device that includes a memory controller configured to couple the memory device to a host device through a first interface, in which the memory device may be integrated with the host device or externally coupled to the host device. The memory device may include a memory controller coupled to a write buffer and configured to access data stored in the write buffer, which has a SLC memory architecture. The memory controller may also be coupled to a memory module through a first channel and configured to access data stored at the memory module through the first channel. The memory module has a higher storage density memory architecture than the write buffer. The memory controller may also be coupled to the host device through a first interface and configured to communicate with the host device over the first interface. The operations may be executed as part of an initialization operation, a read operation or a write operation, a flush operation, or a combination thereof. The operations may be executed as performance of a method, and in some implementations, performance of the operations may be caused by execution by one or more processors, of instructions stored at a non-transitory, computer-readable medium or storage device.

Implementation examples are described in the following numbered clauses:

Clause 1: An apparatus, including: a memory controller: coupled to a write buffer and configured to access data stored at the write buffer, the write buffer having a single-level cell (SLC) memory architecture; coupled to a memory module through a first channel and configured to access data stored at the memory module through the first channel, the memory module having a higher storage density memory architecture than the write buffer; and coupled to a host device through a first interface and configured to communicate with the host device over the first interface, the memory controller configured to perform operations including: maintaining a list of data segments stored in the write buffer, the list including, for each entry of the list, a data segment identifier of a respective data segment and an available contiguous memory space in the write buffer if the data segment is flushed, where the list is sorted based on the available contiguous memory space; detecting a flush opportunity associated with the write buffer; and initiating, based on detection of the flush opportunity, a flush operation to write a first data segment from the write buffer to the memory module, the first data segment corresponding to a first entry of the list.

Clause 2: The apparatus of clause 1, where the operations further include: after completion of the flush operation, deleting the first entry from the list.

Clause 3: The apparatus of clause 1, where the operations further include: identifying one or more data segments stored in the write buffer; and for each of the one or more data segments: calculating the available contiguous memory space in the write buffer if the data segment is flushed; and adding the available contiguous memory space to a corresponding entry of the list.

Clause 4: The apparatus of clause 1, where the operations further include: receiving, from the host device, a write command associated with the write buffer; and writing, based on the write command, a new data segment to the write buffer.

Clause 5: The apparatus of clause 4, where the operations further include: adding a new entry associated with the new data segment to the list; updating one or more entries of the list based on changes to the respective available contiguous memory space caused by adding the new entry; and re-sorting the list based on the available contiguous memory space associated with each entry.

Clause 6: The apparatus of clause 5, where the write command is received after completion of the flush operation, and where the list is re-sorted after deletion of the first entry from the list.

Clause 7: The apparatus of clause 4, where: the write command is received prior to completion of the flush operation; and the operations further include: pausing performance of the flush operation upon receiving the write command, the flush operation having written a portion of the first data segment to the memory module.

Clause 8: The apparatus of clause 7, where the operations further include: initiating, after the new data segment is stored at the write buffer, a second flush operation to write a remainder of the first data segment from the write buffer to the memory module; and after completion of the second flush operation, deleting the first entry from the list.

Clause 9: The apparatus of clause 8, where the operations further include: adding, after deletion of the first entry, a new entry associated with the new data segment to the list; updating one or more entries of the list based on changes to the respective available contiguous memory space caused by adding the new entry; and re-sorting the list based on the available contiguous memory space associated with each entry.

Clause 10: The apparatus of clause 1, where the apparatus includes a flash memory device configured as a universal flash storage (UFS) device.

Clause 11: A method, including: maintaining, at a memory controller of a memory system including a write buffer having a single-level cell (SLC) memory architecture and a memory module having a higher storage density memory architecture than the write buffer, a list of data segments stored in the write buffer, the list including, for each entry of the list, a data segment identifier of a respective data segment and an available contiguous memory space in the write buffer if the data segment is flushed, where the list is sorted based on the available contiguous memory space; detecting, by the memory controller, a flush opportunity associated with the write buffer; and initiating, by the memory controller based on detection of the flush opportunity, a flush operation to write a first data segment from the write buffer to the memory module, the first data segment corresponding to a first entry of the list.

Clause 12: The method of clause 11, where the memory module has a multi-level cell (MLC) memory architecture or a triple-level cell (TLC) memory architecture.

Clause 13: The method of clause 11, further including: sorting, by the memory controller, the list based on the available contiguous memory space associated with each entry.

Clause 14: The method of clause 11, where each entry of the list further includes a size of the respective data segment or a start location and an end location of the respective data segment.

Clause 15: The method of clause 14, where sorting the list includes, for a subset of entries associated with the same available contiguous memory space, sorting the subset of entries in increasing order based on the size.

Clause 16: The method of clause 14, where each entry of the list further includes a timestamp associated with storage of the respective data segment in the write buffer.

Clause 17: The method of clause 16, where sorting the list includes, for a subset of entries associated with the same available contiguous memory space and the same size, sorting the subset of entries in decreasing order based on the timestamp.

Clause 18: The method of clause 11, further including: accessing, by the memory controller, one or more bits of a flush status register associated with the write buffer to determine a type of flush operation being performed at the write buffer.

Clause 19: The method of clause 18, where the type of flush operation includes a standard flush operation, a partial flush operation, or an available contiguous memory space-based flush operation.

Clause 20: The method of clause 11, where the available contiguous memory space associated with a first data segment includes an amount memory space between an ending location associated with a previous data segment with respect to the first data segment in the write buffer and a starting location associated with a next data segment with respect to the first data segment in the write buffer.

Clause 21: The method of clause 11, where the memory system includes a flash memory device configured as a universal flash storage (UFS) device.

Clause 22: A wireless communication device, including: a flash memory device including: a memory controller; a write buffer having a single-level cell (SLC) memory architecture; and a memory module having a higher storage density memory architecture than the write buffer; and at least one processor coupled to the flash memory device through a first interface, where the memory controller is configured to: maintain a list of data segments stored in the write buffer, the list including, for each entry of the list, a data segment identifier of a respective data segment and an available contiguous memory space in the write buffer if the data segment is flushed, where the list is sorted based on the available contiguous memory space; detect a flush opportunity associated with the write buffer; and initiate, based on detection of the flush opportunity, a flush operation to write a first data segment from the write buffer to the memory module, the first data segment corresponding to a first entry of the list.

Clause 23: The wireless communication device of clause 22, where the memory controller is configured to detect the flush opportunity based on receipt of a flush command from the at least one processor.

Clause 24: The wireless communication device of clause 22, where the memory controller is configured to detect the flush opportunity based on detecting a connection to the at least one processor via the first interface is dormant.

Clause 25: The wireless communication device of clause 22, where the memory controller is further configured to delete the first entry from the list responsive to completion of the flush operation.

Clause 26: The wireless communication device of clause 22, where the memory controller is further configured to: identify one or more data segments stored in the write buffer; and for each of the one or more data segments: calculate the available contiguous memory space in the write buffer if the data segment is flushed; and add the available contiguous memory space to a corresponding entry of the list.

Clause 27: The wireless communication device of clause 22, where the memory controller is further configured to: receive, from the at least one processor after completion of the flush operation, a write command associated with the write buffer; write, based on the write command, a new data segment to the write buffer; add a new entry associated with the new data segment to the list; update one or more entries of the list based on changes to the respective available contiguous memory space caused by adding the new entry; and re-sort the list based on the available contiguous memory space associated with each entry.

Clause 28: The wireless communication device of clause 22, where the memory controller is further configured to: receive, from the at least one processor prior to completion of the flush operation, a write command associated with the write buffer, the flush operation having written a portion of the first data segment to the memory module; pause performance of the flush operation upon receipt of the write command; and write, based on the write command, a new data segment to the list.

Clause 29: The wireless communication device of clause 28, where the memory controller is further configured to: initiate, after the new data segment is stored at the write buffer, a second flush operation to write a remainder of the first data segment from the write buffer to the memory module; and delete, after completion of the second flush operation, the first entry from the list.

Clause 30: The wireless communication device of clause 22, where the flash memory device is configured as a universal flash storage (UFS) device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 1-5 and 8 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIG. 4 or 5. Additionally, or alternatively, one or more operations described above with reference to FIGS. 1-3 may be combined with one or more operations described with reference to FIG. 4-5 or 8. Additionally, or alternatively, one or more operations of methods described herein may be performed in a different order than described. For example, operations of method 600 of FIG. 6 or method 700 of FIG. 7 may be performed out of order or in a different order than shown in FIGS. 6-7.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   a memory controller:
   coupled to a write buffer and configured to access data stored at the write buffer, the write buffer having a single-level cell (SLC) memory architecture;
   coupled to a memory module through a first channel and configured to access data stored at the memory module through the first channel, the memory module having a higher storage density memory architecture than the write buffer; and
   coupled to a host device through a first interface and configured to communicate with the host device over the first interface,
   the memory controller configured to perform operations comprising:
   maintaining a list of data segments stored in the write buffer, the list including, for each entry of the list, a data segment identifier of a respective data segment and an available contiguous memory space in the write buffer if the data segment is flushed, wherein the list is sorted based on the available contiguous memory space;
   detecting a flush opportunity associated with the write buffer;
   initiating, based on detection of the flush opportunity, a flush operation to write a first data segment from the write buffer to the memory module, the first data segment corresponding to the first entry of the list;
   receiving, from the host device and prior to completion of the flush operation, a write command associated with the write buffer;
   pausing performance of the flush operation upon receiving the write command, the flush operation having written a portion of the first data segment to the memory module; and
   writing, based on the write command, a new data segment to the write buffer.

2. The apparatus of claim 1, wherein the operations further comprise:
   after completion of the flush operation, deleting the first entry from the list.

3. The apparatus of claim 1, wherein the operations further comprise:
   identifying one or more data segments stored in the write buffer; and
   for each of the one or more data segments:
   calculating the available contiguous memory space in the write buffer if the data segment is flushed; and
   adding the available contiguous memory space to a corresponding entry of the list.

4. The apparatus of claim 1, wherein the operations further comprise:
   adding a new entry associated with the new data segment to the list;
   updating one or more entries of the list based on changes to the respective available contiguous memory space caused by adding the new entry; and
   re-sorting the list based on the available contiguous memory space associated with each entry.

5. The apparatus of claim 4, wherein the write command is received after completion of the flush operation, and wherein the list is re-sorted after deletion of the first entry from the list.

6. The apparatus of claim 1, wherein the operations further comprise:
  initiating, after the new data segment is stored at the write buffer, a second flush operation to write a remainder of the first data segment from the write buffer to the memory module; and
  after completion of the second flush operation, deleting the first entry from the list.

7. The apparatus of claim 6, wherein the operations further comprise:
  adding, after deletion of the first entry, a new entry associated with the new data segment to the list;
  updating one or more entries of the list based on changes to the respective available contiguous memory space caused by adding the new entry; and
  re-sorting the list based on the available contiguous memory space associated with each entry.

8. The apparatus of claim 1, wherein the apparatus comprises a flash memory device configured as a universal flash storage (UFS) device.

9. A method, comprising:
  maintaining, at a memory controller of a memory system including a write buffer having a single-level cell (SLC) memory architecture and a memory module having a higher storage density memory architecture than the write buffer, a list of data segments stored in the write buffer, the list including, for each entry of the list, a data segment identifier of a respective data segment and an available contiguous memory space in the write buffer if the data segment is flushed, wherein the list is sorted based on the available contiguous memory space;
  detecting, by the memory controller, a flush opportunity associated with the write buffer;
  initiating, by the memory controller based on detection of the flush opportunity, a flush operation to write a first data segment from the write buffer to the memory module, the first data segment corresponding to the first entry of the list;
  receiving, from the host device and prior to completion of the flush operation, a write command associated with the write buffer;
  pausing performance of the flush operation upon receiving the write command, the flush operation having written a portion of the first data segment to the memory module; and
  writing, based on the write command, a new data segment to the write buffer.

10. The method of claim 9, wherein the memory module has a multi-level cell (MLC) memory architecture or a triple-level cell (TLC) memory architecture.

11. The method of claim 9, further comprising:
  sorting, by the memory controller, the list based on the available contiguous memory space associated with each entry.

12. The method of claim 9, wherein each entry of the list further includes a size of the respective data segment or a start location and an end location of the respective data segment.

13. The method of claim 12, wherein sorting the list comprises, for a subset of entries associated with the same available contiguous memory space, sorting the subset of entries in increasing order based on the size.

14. The method of claim 12, wherein each entry of the list further includes a timestamp associated with storage of the respective data segment in the write buffer.

15. The method of claim 14, wherein sorting the list comprises, for a subset of entries associated with the same available contiguous memory space and the same size, sorting the subset of entries in decreasing order based on the timestamp.

16. The method of claim 9, further comprising:
  accessing, by the memory controller, one or more bits of a flush status register associated with the write buffer to determine a type of flush operation being performed at the write buffer.

17. The method of claim 16, wherein the type of flush operation includes a standard flush operation, a partial flush operation, or an available contiguous memory space-based flush operation.

18. The method of claim 9, wherein the available contiguous memory space associated with a first data segment comprises an amount memory space between an ending location associated with a previous data segment with respect to the first data segment in the write buffer and a starting location associated with a next data segment with respect to the first data segment in the write buffer.

19. The method of claim 9, wherein the memory system comprises a flash memory device configured as a universal flash storage (UFS) device.

20. A wireless communication device, comprising:
  a flash memory device comprising:
    a memory controller;
    a write buffer having a single-level cell (SLC) memory architecture; and
    a memory module having a higher storage density memory architecture than the write buffer; and
  at least one processor coupled to the flash memory device through a first interface,
  wherein the memory controller is configured to:
    maintain a list of data segments stored in the write buffer, the list including, for each entry of the list, a data segment identifier of a respective data segment and an available contiguous memory space in the write buffer if the data segment is flushed, wherein the list is sorted based on the available contiguous memory space;
    detect a flush opportunity associated with the write buffer; and
    initiate, based on detection of the flush opportunity, a flush operation to write a first data segment from the write buffer to the memory module, the first data segment corresponding to the first entry of the list;
    receiving, from the host device and prior to completion of the flush operation, a write command associated with the write buffer;
    pausing performance of the flush operation upon receiving the write command, the flush operation having written a portion of the first data segment to the memory module; and
    writing, based on the write command, a new data segment to the write buffer.

21. The wireless communication device of claim 20, wherein the memory controller is configured to detect the flush opportunity based on receipt of a flush command from the at least one processor.

22. The wireless communication device of claim 20, wherein the memory controller is configured to detect the flush opportunity based on detecting a connection to the at least one processor via the first interface is dormant.

23. The wireless communication device of claim 20, wherein the memory controller is further configured to delete the first entry from the list responsive to completion of the flush operation.

24. The wireless communication device of claim 20, wherein the memory controller is further configured to:
  identify one or more data segments stored in the write buffer; and
  for each of the one or more data segments:
    calculate the available contiguous memory space in the write buffer if the data segment is flushed; and
    add the available contiguous memory space to a corresponding entry of the list.

25. The wireless communication device of claim 20, wherein the memory controller is further configured to:
  receive, from the at least one processor after completion of the flush operation, a write command associated with the write buffer;
  write, based on the write command, a new data segment to the write buffer;
  add a new entry associated with the new data segment to the list;
  update one or more entries of the list based on changes to the respective available contiguous memory space caused by adding the new entry; and
  re-sort the list based on the available contiguous memory space associated with each entry.

26. The wireless communication device of claim 20, wherein the memory controller is further configured to:
  initiate, after the new data segment is stored at the write buffer, a second flush operation to write a remainder of the first data segment from the write buffer to the memory module; and
  delete, after completion of the second flush operation, the first entry from the list.

27. The wireless communication device of claim 20, wherein the flash memory device is configured as a universal flash storage (UFS) device.

* * * * *